A. CLARK.
Pitchfork

No. 7,697. Patented Oct. 8, 1850.

UNITED STATES PATENT OFFICE.

ALINZOR CLARK, OF SOUTHFIELD, NEW YORK.

IMPROVEMENT IN HAY-FORKS.

Specification forming part of Letters Patent No. 7,697, dated October 8, 1850.

*To all whom it may concern:*

Be it known that I, ALINZOR CLARK, of Southfield, in the county of Richmond (Staten Island) and State of New York, have invented a new and useful Improvement in Pitchforks; and I do hereby declare that the following is a full, clear, and exact description of the construction thereof, reference being had to the accompanying drawings, forming part of this specification, in which—

Figure 1:
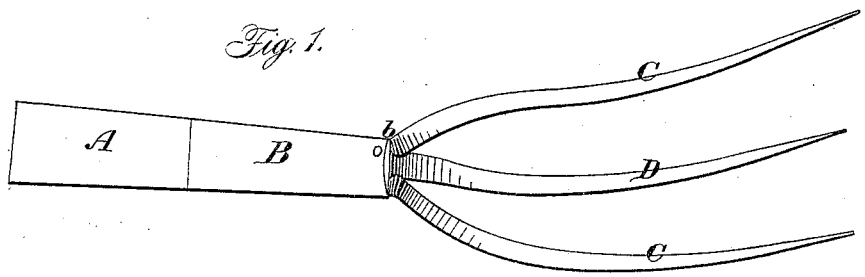
Figure 2:
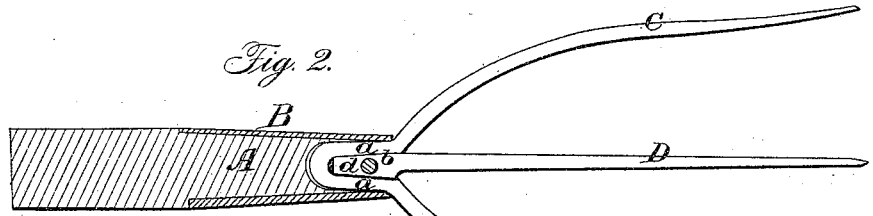
Figure 4:
Figure 5:
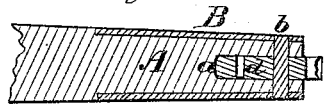
Figure 3:
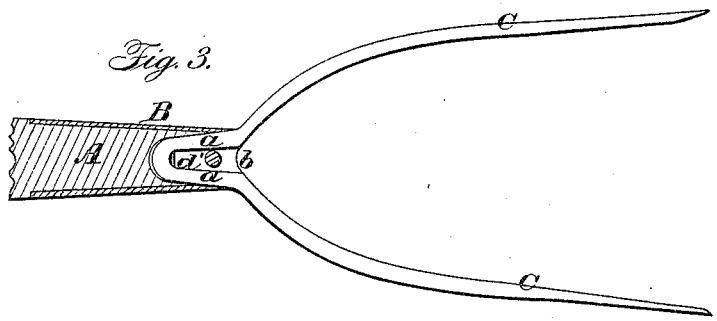

Figure 1 is a perspective view of a three-tined fork, part of the handle being cut off. Fig. 2 represents the fork entire and the handle in section. Fig. 3 is a view similar to Fig. 2, but having the center tine taken out to form a two-tined fork. Fig. 4 represents the form of the ends of the tines which are secured in the handle. Fig. 5 is a longitudinal section through the center at right angles to Figs. 2 and 3.

Similar letters of reference indicate corresponding parts in each of the several figures.

The nature of my invention consists in an improved mode of inserting and securing the tines in the stock or handle of the fork, by which the same fork can be used as a two-tined or a three-tined fork, according to the nature of the work to be performed, two tines being better suited for some descriptions of work and three tines for others.

To enable others skilled in the art to make and use my invention, I will describe its construction.

A represents the end of the handle of the fork. B is the ferrule which surrounds it.

C C are the two outer tines of the fork, which are formed of one piece of steel or iron, bent at the parts $a\ a$ fitting in the handle to the form shown in Figs. 1, 2, 3, and 4, a suitable hole being made in the end of the handle A, into which they are tightly fitted, being also notched into the edges of the ferrule B.

D is the center tine of the fork, having its shank $d$ of wedge form, fitting tightly between the parts $a\ a$ of the outer tines, and filling up the space between them in the hole in the handle. The parts $a\ a$ and the shank $d$ are flattened, so as to fit more securely in the handle.

When the tines are fitted in the handle and driven tight a hole is drilled or otherwise made through the ferrule B, passing directly through the handle and through the shank $d$, and a pin, $b$, is inserted and tightly driven in. The hole and the pin should be slightly tapered. The shank $d$, forming a wedge, will prevent the tines C C from being drawn out, being itself secured by the pin $b$.

When it is required to take out the center tine, D, to make the fork two-tined a wedge, $d'$, is inserted in this place, the said wedge being of precisely similar form with the shank $d$, and having a hole corresponding with that through the handle in which the pin $b$ fits. It is secured by the pin in the same manner as $d$, being slightly tapered, is easily knocked out, but still can be driven in sufficiently tight to make tines perfectly secure in the handle, so that there will not be the slightest danger of their becoming loose.

What I claim as new in my invention, and desire to secure by Letters Patent, is—

The manner, substantially as herein described, of forming the tines C C and fitting them in the stock or handle, so that they can be secured in the stock or handle either by the wedge-shank $d$ of the center tire, D, or by a detached wedge, $d'$, of similar form, and the pin $b$, so as to make either a two-tined or a three-tined fork.

ALINZOR CLARK.

Witnesses:
O. D. MUNN,
G. W. NELSON.